United States Patent [19]

Sato et al.

[11] Patent Number: 5,006,242
[45] Date of Patent: Apr. 9, 1991

[54] MECHANICALLY SECURED WOOL FILTER CARTRIDGE

[75] Inventors: Mikio Sato, Sagamihara; Tsuneo Yamaguchi, Kawasaki, both of Japan

[73] Assignee: Wako Sangyo Kabushiki Kaisha, Tokyo, Japan

[21] Appl. No.: 357,935

[22] Filed: May 26, 1989

[30] Foreign Application Priority Data

Sep. 30, 1988 [JP] Japan .................................. 63-247231

[51] Int. Cl.⁵ .............................................. B01D 27/04
[52] U.S. Cl. ..................................... 210/232; 210/457; 210/497.2; 210/509; 55/475
[58] Field of Search ................ 210/446, 447, 457, 458, 210/483, 484, 485, 486, 493.1, 493.2, 493.5, 494.1, 497.01, 497.2, 232, 509; 55/484, 475

[56] References Cited

U.S. PATENT DOCUMENTS

| | | | |
|---|---|---|---|
| 4,225,442 | 9/1980 | Tremblay et al. | 210/457 |
| 4,392,958 | 7/1983 | Garzi et al. | 210/493.2 |
| 4,402,830 | 9/1983 | Pall | 210/457 |
| 4,512,892 | 4/1985 | Garzi et al. | 210/493.2 |
| 4,552,657 | 11/1985 | Ogawa | 210/493.1 |
| 4,652,285 | 3/1987 | Greene | 210/493.1 |

Primary Examiner—Robert A. Dawson
Assistant Examiner—Wanda L. Millard
Attorney, Agent, or Firm—Browdy and Neimark

[57] ABSTRACT

There is disclosed a fluid filtration element having a porous core cylinder, a sectionally thick filtration cylinder fitted around the core cylinder, and end plates secured to the end surfaces of filtration cylinder. Highly densified portions are formed at the filtration cylinder ends to which the end plates are press-fitted, thereby hindering the fluid permeation. Sectionally thin protrusions erected on the end plate surfaces are cut into the highly densified portions.

2 Claims, 3 Drawing Sheets

MECHANICALLY SECURED WOOL FILTER CARTRIDGE

BACKGROUND OF THE INVENTION

1. Field of the Invention

The present invention is directed to a cartridge type or a so-called depth type element for filtrating a fluid, which is incorporated into a moisture condensing separator or a filter of a fluid processing unit.

2. Description of the Prior Art

As is broadly known, the conventional cartridge type fluid filtration element is constructed in such a way that a filtration cylinder formed of glass wool and with a relatively large thickness is fitted to the exterior of a porous core cylinder, and doughnut disk-like end plates are fixed to both end surfaces of the filtration cylinder. The end plates are indispensable for regulating the filtrating directions in which the fluid permeates the filtration cylinder from inside to outside and vice versa so that the fluid never permeates both end portions thereof. There has heretofore been adopted a means for fixedly sealing the end plates to the end surfaces of the filtration cylinder with a synthetic resin bonding agent or by use of a mold. For instance, when filtrating a special fluid having a high temperature or a resinous melt property, the bonding agent or the mold is melted at high temperatures or due to chemical influences, with the result that the end plates are removed therefrom. It is therefore impossible to utilize the cartridge type filtration element to which the end plates are fixed with the bonding agent or by the mold. The filtration of the above-described special fluid typically involves a so-called filtration material charging method in which a filtration material is charged directly in the filter, because there is no other proper means. Take the moisture condensing separation for example, hydrocarbon can be separated from water at 10 ppm or less by using the cartridge type element. Whereas by charging the filtration material, the separation is effected unfavorably at 100~500 ppm. Under such circumstances, a compromise is that this unfavorable performance may be ignored as an inevitable problem. The filtration is performed mainly on the basis of the filtration material charging method.

SUMMARY OF THE INVENTION

A filtrating process can be effected by employing a cartridge type filtration element having a high filtrating performance instead of a conventional filtration material charging method exhibiting a low performance, provided that end plates can be simply fixed to the end surfaces of a filtration cylinder, using no bonding agent or mold.

Accordingly, it is a primary object of the present invention which is based on this idea to obviate the foregoing problems incidental to the use of a bonding agent or a mold to provide a cartridge type fluid filtration element capable of filtrating a special fluid by hindering the permeation of fluid into the end portions of a filtration cylinder with highly densified portions formed by compressing the filtration materials at the end portions on which the end plates are fixedly mounted without using any bonding agent or mold.

To this end, according to one aspect of the invention, there is provided a fluid filtration element comprising: a porous core cylinder; a filtration cylinder formed of glass wool and with a large thickness which is fitted around the porous core cylinder; and end plates secured to both end surfaces of the filtration cylinder, wherein highly densified portions for hindering permeation of a fluid are formed at the ends of the filtration cylinder, the formation thereof involving compression of the filtration material by fastening bands wound flexibly on the end outer peripheries thereof, and the end plates are press-fitted to the highly densified end surfaces of the filtration cylinder by a mechanical fastening means.

Based on this construction in accordance with the present invention, endless thin protrusions erected on the end plate surfaces press-fitted to the end surfaces of the filtration cylinder are cut into the highly densified portions of the filtration cylinder.

BRIEF DESCRIPTION OF THE INVENTION

Other objects and advantages of the invention will become apparent during the following discussion in conjunction with the accompanying drawings, in which:

FIG. 1 is a vertical front elevation in section;
FIG. 2 is a plan view with parts cut away; and
FIG. 3 is an enlarged sectional view.

DETAILED DESCRIPTION OF THE PREFERRED EMBODIMENT

Figure 1:
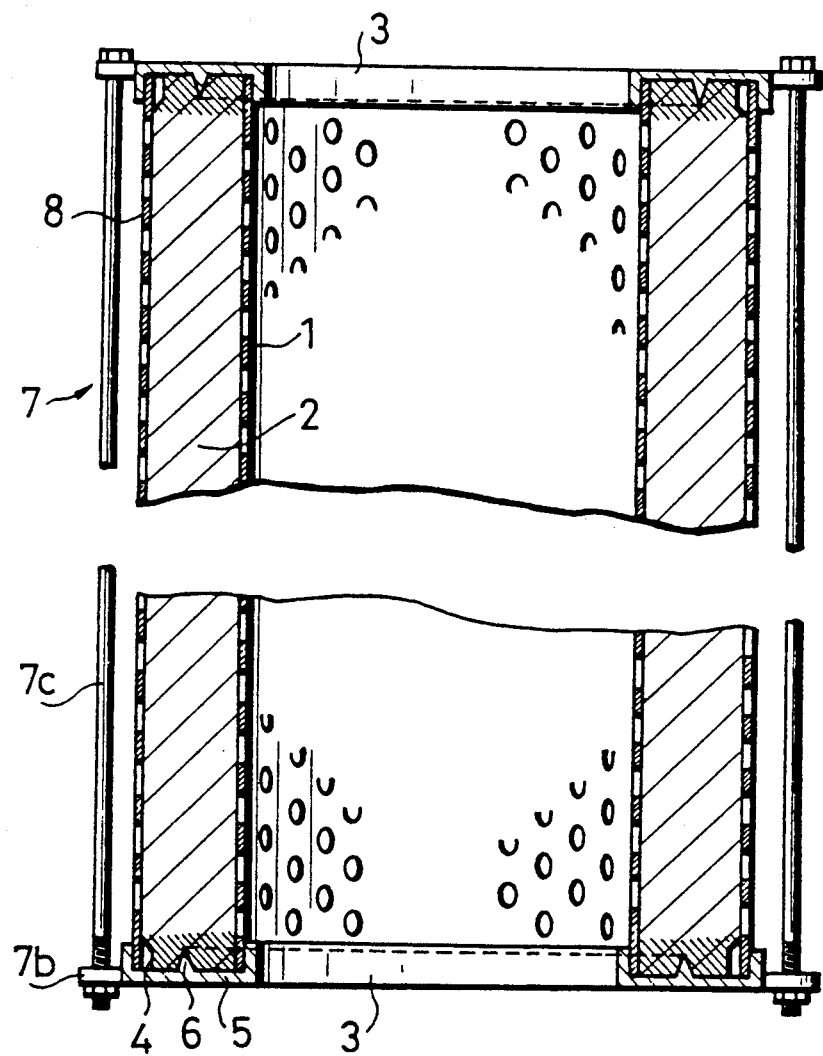
Figure 2:
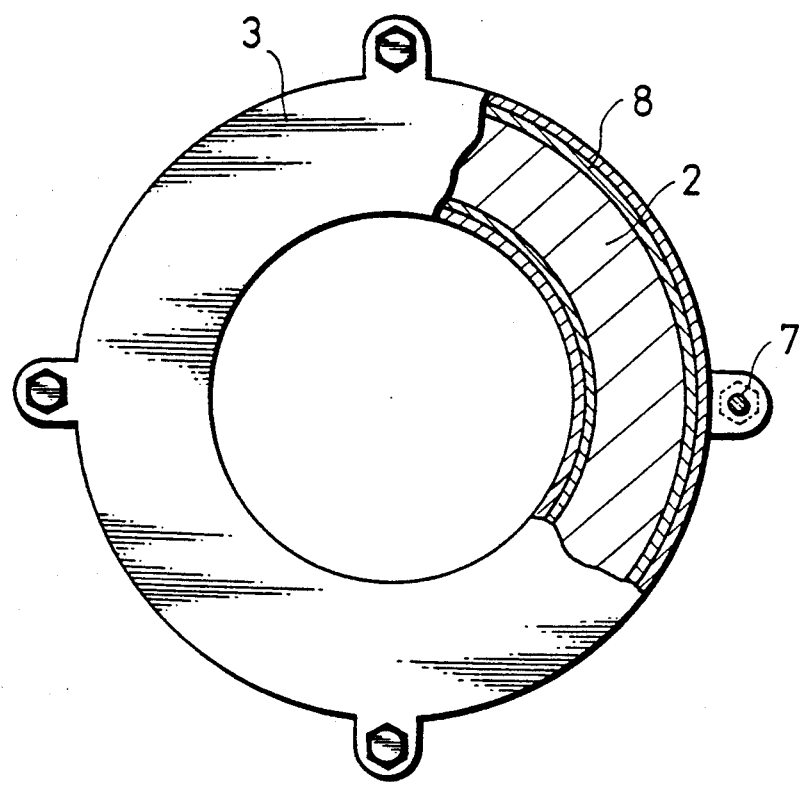
Figure 3:
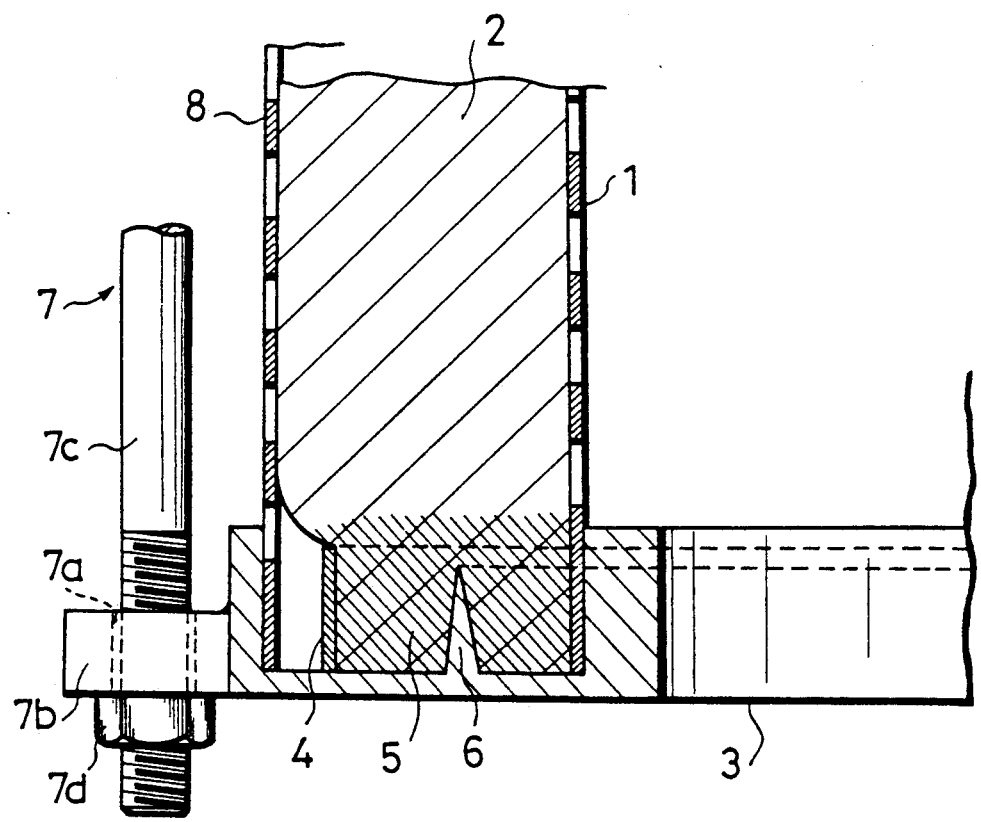

An illustrative embodiment of the present invention will hereinafter be described with reference to the accompanying drawings.

Fitted around a porous core cylinder 1 formed of a metallic punched plate is a filtration cylinder 2 (a depth type filtration member) composed of a filtration material such as glass wool and with a relatively large thickness in section. Metallic end plates 3 each having a doughnut disk-like configuration are fixed to both end surfaces of filtration cylinder 2, thus constructing an element for filtrating a fluid. In this type of fluid filtration element, the end plates 3 are fixed in the following manner: Metallic bands 4 each having a relatively small width are wound flexibly on the outer peripheries of both end portions of filtration cylinder 2. The filtration material is compressed by fastening bands 4. The compression thereof in turn serves to form highly densified portions 5 for hindering the permeation of the fluid into the portions at a portion, wound with bands 4, of the filtration cylinder. Cut into the highly densified end surfaces of filtration cylinder 2 are endless ring-like thin protrusions 6 each having a wedge-like configuration in section, the protrusions being erectly shaped on the surfaces of end plates 3. End plates 3 provided at both ends thereof are press-fitted to the end surfaces of filtration cylinder 2 by mechanical connecting means 7 capable of being freely fastened.

Note that freely fastening mechanical means 7 employed in this embodiment are constituted such that protruding pieces 7b provided with bolt holes 7a are disposed at equal intervals and overhang from the outer peripheries of end plates 3, bolts 7c are inserted into bolt holes 7a and interposed between protruding pieces 7b disposed via-á-vis with each other, and bolts 7c are then fastened with nuts 7d, thus closely securing end plates 3 to both end surfaces of filtration cylinder 2. Thus, protrusions 6 are held cut into the end surfaces.

There will be given another example of the connecting means, wherein a center rod, though not illustrated, is disposed on the central axial line of filtration cylinder 2 to connect, as a matter of course, the end plates by fastening them. The requirement for the connecting means is to press-fit the end plates to both end portions of filtration cylinder 3. Hence, the connecting means is not confined to the arrangement shown in the above-described embodiment.

Note that the reference numeral 8 designates an outer cylinder composed of a metallic punched plate, the outer cylinder being fitted around the outermost part of filtration cylinder 2. The inner circumferential parts of end plates 3 are also secured to both end portions of outer cylinder 8.

Where the thus constructed element dedicated to filtration of a fluid is invested with a filter function to eliminate the dust, the element is of course incorporated into a filter. In the case of providing the element with a separating function to separate the moisture content from oil, e.g., fuel oil, the element is obviously incorporated into a moisture condensing separator. Apropos of the filtrating action, as in the commonly used manner, the fluid is of course fed under pressure and forced to permeate filtration cylinder 2 constituting the filtration element from inside to outside, and vice versa. In this case, however, the essential action of the invention will be clarified from such an arrangement that when the fluid permeates filtration cylinder 2, its resistances at both ends of the filtration cylinder increase because of highly densified portions 5 formed thereabout. As a result, the fluid flows not into highly densified portions 5 but into other portions with low densities. That is, the fluid permeates the low resistance portions between highly densified portions 5 of the filtration cylinder.

If a differential pressure of permeation is caused by clogging after the filtration element has been used for a long period of time, the fluid tends to permeate highly densified portions 5 having higher resistances. However, endless ring-like thin protrusions 6 are cut into highly densified portions 5, thereby hindering the fluid from permeating the highly densified portions. Hence, there is no possibility of unfiltered fluid being taken out.

As discussed above, in accordance with the present invention, the means for fixing the end plates to the end surfaces of the filtration cylinder consists of forming the highly densified portions, at both ends of the filtration cylinder, for hindering the fluid permeation, the formation thereof involving the compression of the filtration material by fastening the bands, and press-fitting the end plates to the highly densified end surfaces of the filtration cylinder through the freely fastening connecting means. Namely, unlike the prior art, the filtration element is not constructed by employing bonding agent or mold. By virtue of this arrangement, the element can be used effectively for the filtrating process of a special fluid having high temperature or a resinous melt property.

The endless thin protrusions formed on the end plates are cut into the highly densified portions. Even when the fluid makes an attempt to enter the highly densified portions, the endless protrusions function to hinder the permeation thereof, thus obviating the problem that unfiltered fluid is to be taken out.

Although the illustrative embodiment of the present invention has been described in detail with reference to the accompanying drawings, it is to be understood that the present invention is not limited to that precise embodiment. Various changes or modifications may be effected therein by one skilled in the art without departing from the scope or spirit of the invention.

What is claimed is:

1. A cartridge-type fluid filtration element for filtrating a fluid, comprising:
   a porous core cylinder;
   a filtration cylinder formed of glass wool of large thickness fitted around said porous core cylinder; and
   end plates secured to both end surfaces of said filtration cylinder without bonding or molding; wherein highly densified portions for hindering permeation of the fluid are formed at the ends of said filtration cylinder by compression of said glass wool filtration material by fastening bands wound flexibly on end outer peripheries thereof, and wherein said end plates are press-fitted to highly densified end portions of said filtration cylinder by interposed mechanical means connecting said end plates.

2. The fluid filtrating element as set forth in claim 1, wherein endless ring-like thin wedge protrusions erected on said end plate surfaces are press-fitted to said end surfaces of said filtration cylinder and cut into said highly densified portions of said filtration cylinder to hinder fluid from permeating the highly densified portions.

* * * * *